United States Patent
Lead et al.

(10) Patent No.: US 12,103,880 B2
(45) Date of Patent: *Oct. 1, 2024

(54) METHODS FOR THE AMELIORATION OF OIL TOXICITY AND STIMULATION OF BACTERIAL OIL DEGRADATION

(71) Applicant: University of South Carolina, Columbia, SC (US)

(72) Inventors: Jamie Lead, Chapin, SC (US); Alan Decho, Columbia, SC (US)

(73) Assignee: UNIVERSITY OF SOUTH CAROINA, Columbia, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/471,528

(22) Filed: Sep. 21, 2023

(65) Prior Publication Data

US 2024/0010536 A1    Jan. 11, 2024

Related U.S. Application Data

(63) Continuation of application No. 16/466,853, filed as application No. PCT/US2017/064884 on Dec. 6, 2017, now Pat. No. 11,814,308.

(Continued)

(51) Int. Cl.
*C02F 3/34* (2023.01)
*B01J 20/22* (2006.01)
(Continued)

(52) U.S. Cl.
CPC ............. *C02F 3/344* (2013.01); *B01J 20/223* (2013.01); *B01J 35/53* (2024.01); *C02F 1/288* (2013.01);
(Continued)

(58) Field of Classification Search
CPC .......... C02F 1/288; C02F 1/281; C02F 1/285; C02F 2101/32; C02F 2103/08;
(Continued)

(56) References Cited

U.S. PATENT DOCUMENTS 9,835,628 B2    12/2017    Lead et al.
10,071,919 B2    9/2018    Lead et al.
(Continued)

FOREIGN PATENT DOCUMENTS

GB    2431926 A    5/2007
JP    S 6078926    5/1985
(Continued)

OTHER PUBLICATIONS

Atlas, et al. "Oil Biodegradation and Bioremediation: A Tale of the Two Worst Spills in U.S. History" *Env. Sci. Tech.* 45(16) (2011) pp. 6709-6715.

(Continued)

*Primary Examiner* — Joseph W Drodge
(74) *Attorney, Agent, or Firm* — DORITY & MANNING, P.A.

(57) ABSTRACT

Methods are provided for using a combination of nanomaterials and oil-degrading bacteria to detoxify a multiphasic liquid (e.g., an oil-water mixture) and to ameliorate the toxicity of oil to local organisms, e.g., meiobenthos, in or near the area of the multiphasic liquid. The methods can be utilized for oil recovery and environmental clean-up and detoxification after spills and discharges. Through synergistic combination of the nanomaterials with oil degrading bacteria, methods can ameliorate environmental damage due to the presence of oil in an area through increased activation of the bacteria as well as through removal of the oil.

22 Claims, 8 Drawing Sheets

Related U.S. Application Data

(60) Provisional application No. 62/430,438, filed on Dec. 6, 2016.

(51) Int. Cl.
    B01J 35/53    (2024.01)
    C02F 1/28    (2023.01)
    C02F 101/32    (2006.01)
    C02F 103/08    (2006.01)

(52) U.S. Cl.
    CPC ....... B01J 2220/4868 (2013.01); C02F 1/281 (2013.01); C02F 1/285 (2013.01); C02F 2101/32 (2013.01); C02F 2103/08 (2013.01); C02F 2305/06 (2013.01); C02F 2305/08 (2013.01)

(58) Field of Classification Search
    CPC .. C02F 3/344; C02F 2305/08; C02F 2305/06; C02F 3/34; C02F 3/341; C02F 3/348; C02F 2003/001; B01J 31/00; B01J 31/02; B01J 31/26; B01J 31/28; B01J 35/33; B01J 35/51; B01J 35/53; B01J 35/57; B01J 35/61; B01J 35/64; B01J 35/643; B01J 35/647; B01J 35/651; B01J 35/66; B01J 20/22; B01J 20/223; B01J 20/2808; B01J 20/28083; B01J 20/28019; B01J 2220/46; B01J 2220/4868; B01J 35/0033; B01J 35/1052; B01J 35/1057; B01J 35/1061; B01J 35/1066
    See application file for complete search history.

(56) References Cited

U.S. PATENT DOCUMENTS

| | | | |
|---|---|---|---|
| 10,174,136 | B2 | 1/2019 | Lead |
| 10,183,259 | B2 * | 1/2019 | Yu ...................... B01D 67/0004 |
| 11,814,308 | B2 * | 11/2023 | Lead ........................ C02F 3/344 |
| 2009/0246143 | A1 | 10/2009 | Bonitatibus et al. |
| 2010/0059449 | A1 | 3/2010 | Grass et al. |
| 2011/0052467 | A1 * | 3/2011 | Chase ............... C04B 35/63444 |
| | | | 502/332 |
| 2011/0124492 | A1 | 5/2011 | Loukine et al. |
| 2015/0041399 | A1 | 2/2015 | Tennant |
| 2015/0223470 | A1 | 8/2015 | Rodriguez Quintero |
| 2015/0298993 | A1 | 10/2015 | Lead |
| 2015/0309043 | A1 | 10/2015 | Lead et al. |
| 2016/0289101 | A1 | 10/2016 | Bennetzen et al. |
| 2017/0247481 | A1 | 8/2017 | Lead |
| 2018/0255784 | A1 | 9/2018 | Chanda et al. |
| 2019/0023591 | A1 | 1/2019 | Lead et al. |

FOREIGN PATENT DOCUMENTS

| | | |
|---|---|---|
| RU | 2012116827 | 10/2013 |
| WO | WO 9317971 | 9/1993 |
| WO | WO 2013/009744 | 1/2013 |
| WO | WO 2018/106791 | 6/2018 |

OTHER PUBLICATIONS

Balnois, et al. "Atomic force microscopy of humic substances: Effects of pH and ionic strength," Env. Sci. Tech. 33(21) (1999) pp. 3911-3917.
Barron, M.G. "Ecological Impacts of the Deepwater Horizon Oil Spill: Implications for Immunotoxicity" Tox. Path. 40(2) (2012) pp. 315-320.
Betke, et al. "Bottom-up, wet chemical technique for the continuous synthesis of inorganic nanoparticles" Inorganics 2(1) (2014) pp. 1-15.
Calcagnile, et al. "Magnetically Driven Floating Foams for the Removal of Oil Contaminants from Water" ACS Nano 6(6) (2012) pp. 5413-5419.
Carman, et al. Response of benthic food web to hydrocarbon contamination, Limnol. Oceanogr. 42(3) p. 561-571 (1997).
Chen, et al. "Synthesis of highly hydrophobic floating magnetic polymer nanocomposites for the removal of oils from water surface" Appl. Surf. Sci. 286 (2013) pp. 249-256.
Chin, et al. "Synthesis and characterization of magnetic iron oxide nanoparticles via w/o microemulsion and Massart's procedure" J Mater. Proc. Tech. 191(1) (2007) pp. 235-237.
Chu, et al. "Three-Dimensionally Macroporous Fe/C Nanocomposites as Highly Selective Oil-Absorption Materials" Appl. Mater. Inter. 4(5) (2012) pp. 2420-2425.
Chugaev, et al. "High-Noble Measurement of $^{107}$Ag/$^{109}$Ag in Native Silver and Gold by Multicollector Inductively Coupled Plasma Mass Spectrometry (MC-ICP-MS)" Geochem. Inter. 50(11) (2012) pp. 899-910.
Coleman, et al. "Oil in the Sea III: Inputs, Fates, and Effects" National Research Council (2003) pp. 1-264.
De Souza, et al. "A Magnetic Composite for Cleaning of Oil Spills on Water" Macro. Mater. Eng. 295(10) (2010) pp. 942-948.
DeLaune, et al. "Projected Impact of Deepwater Horizon Oil Spill on U.S. Gulf Coast Wetlands" Soil Sci. Soc. Am. J 75(5) (2011) pp. 1602-1612.
Deng, et al. "Hydrophobic Meshes for Oil Spill Recovery Devices" Appl. Mater. Interf. 5(3) (2013) pp. 774-781.
Fontenot, et al. "An Evaluation of Water Quality in Private Drinking Water Wells Near Natural Gas Extraction Sites in the Barnett Shale Formation" Env. Sci. Tech. 47(17) (2013) pp. 10032-10040.
Graham, et al. "Deep Water: The Gulf Oil Disaster and the Future of Offshore Drilling: Report to the President" National Commission on the BP Deepwater Horizon Spill and Offshore Drilling (2011).
Gui, et al. "Magnetic and Highly Recyclable Macroporous Carbon Nanotubes for Spilled Oil Sorption and Separation" Appl. Mater. Interf. 5 (2013) pp. 5845-5850.
Gui, et al. "Soft, highly conductive nanotube sponges and composites with controlled compressibility" ACS Nano 4(4) (2010) pp. 2320-2326.
Handley et al. Biogeochemical implications of the ubiquitous colonization of marine habitats and redox gradients by Marinobacter species, frontiers in Mircrob., vol. 4 Article 136 (2013).
Hara, et al. "Alcanivorax which prevails in oil-contaminated seawater exhibits broad substrate specifically for alkane degradation" Sep. 2003, Environ Microbiol, 5(9):746-753.
Hitchman, et al. "The effect of environmentally relevant conditions on PVP stabilised gold nanoparticles" Chemosphere 90(2) (2013) pp. 410-416.
Hubbe, et al. "Cellulosic Substrates for Removal of Pollutants from Aqueous Systems: A Review. 3. Spilled Oil and Emulsified Organic Liquids" BioResources 8(2) (2013) pp. 3038-3097.
Kadar, et al. "The influence of engineered $Fe_2O_3$ nanoparticles and soluble ($FeCl_3$) iron on the developmental toxicity caused by $CO_2$-induced seawater acidification" Environmental Pollution 158(12) (2010) pp. 3490-3497.
Kimata, et al. "Preparation of monodisperse magnetic particles by hydrolysis of iron alkoxide" Powder Technology 132(2) (2003) pp. 112-118.
Korhonen, et al. "Hydrophobic nanocellulose aerogels as floating, sustainable, reusable, and recyclable oil absorbents" Appl. Mater. Interf. 3(6) (2011) pp. 1813-1816.
Labson, et al. "Estimated minimum discharge rates of the Deepwater Horizon spill interim report to the Flow Rate Technical Group from the Mass Balance Team" (2010).
Lehr, et al. "Oil Budget Calculator: Deepwater Horizon" The Federal Interagency Solutions Group (2010) pp. 1-214.
Li, et al. "Stable silver isotope fractionation in the natural transformation process of silver nanoparticles" Nanotechn. Lett. 11(8):682 (2016) pp. 1-6.
MacDonald, et al. "Estimates of natural hydrocarbon flux in the Gulf of Mexico basin from remote sensing data" Geophys. Res. Abst. 7:09907 (2005) pp. 1-2.

(56) References Cited

OTHER PUBLICATIONS

Merkel, et al. "Ultrapermeable, reverse-selective nanocomposite membranes" *Science* 296 (2002) pp. 519-522.
Milic, "Bioremediation of Oil Spills", Submitted as coursework for PH240 Standford University, Fall 2014.
Mirshahghassemi, et al. "Oil Recovery from Water under Environmentally Relevant Conditions Using Magnetic Nanoparticles" *Env. Sci. Tech.* 49(19) (2015) pp. 11729-11736.
Nakazawa, et al. "Coadsorption of water and selected aromatic molecules to model the adhesion of epoxy resins on hydrated surfaces of zinc oxide and iron oxide" *Appl. Surf. Sci.* 84(3) (1995) pp. 309-323.
Osborn, et al. "Methane contamination of drinking water accompanying gas-well drilling and hydraulic fracturing" *Proc. Nat. Acad. Sci. USA* 108(20) (2011) pp. 8172-8176.
Palchoudhury, et al. "A Facile and Cost-Effective Method for Separation of Oil-Water Mixtures Using Polymer-Coated Iron Oxide Nanoparticles" *Env. Sci. Tech.* 48(24) (2014) pp. 14558-14563.
Pantoja, et al. "Prediction of crude oil properties and chemical composition by means of steady-state and time-resolved fluorescence" *Energy & Fuels* 25(8) (2011) pp. 3598-3604.
Pavi'A-Sanders, et al. "Robust Magnetic/Polymer Hybrid Nanoparticles Designed for Crude Oil Entrapment and Recovery in Aqueous Environments" *ACS Nano* 7(9) (2013) pp. 7552-7561.
Payne, et al. "Oil Spills Abatement: Factors Affecting Oil Uptake by Cellulosic Fibers" *Env. Sci. Tech.* 46(14) (2012) pp. 7725-7730.
Peña-Rodriguez, et al. "Enhanced plasmonic behavior of bimetallic (Ag—Au) multilayered spheres" *Nanosc. Res. Lett.* 6:279 (2011) pp. 1-5.
Petschacher, et al. "Thinking continuously: A microreactor for the production and scale-up of biodegradable, self-assembled nanoparticles" *Polymer Chemistry* 4(7) (2013) pp. 2342-2352.
Prodan, et al. "A Hybridization Model for the Plasmon Response of Complex Nanostructures" *Science* 302 (2003) pp. 419-422.
Radloff, et al. "Plasmonic Properties of Concentric Nanoshells" *Nano Letters* 4(7) (2004) pp. 1323-1327.
Reimer, et al. "Ferucarbotran (Resovist): A new clinically approved RES-specific contrast agent for contrast-enhanced MRI of the liver: properties, clinical development, and applications" *Euro. Rad.* 13(6) (2003) pp. 1266-1276.
Rizwan, et al. Ecofriendly Application of Nanomaterials: Nanobioremediation:, Journal of Nanoparticles, vol. 2014, Article ID 431787, Published Jun. 19, 2014.
Römer et al. "Aggregation and dispersion of silver nanoparticles in exposure media for aquatic toxicity tests" *J Chromat. A* 1218 (2011) pp. 4226-4233.
Rose, et al. "Drug Embedded PVP Coated Magnetic Nanoparticles for Targeted Killing of Breast Cancer Cells" *Tech. Cancer Res. Treat.* (2013) pp. 1-10.
Ryder, A.G. "Ch. 8: Analysis of crude petroleum oils using fluorescence spectroscopy" *Rev. Fluor.* (2005) pp. 169-198. (Abstract only).
Sun, et al. "Magnetically motive porous sphere composite and its excellent properties for the removal of pollutants in water by adsorption and desorption cycles" *Adv. Mater.* 18(15) (2006) pp. 1968-1971.
Tejamaya, et al. "Stability of Citrate, PVP, and PEG Coated Silver Nanoparticles in Ecotoxicology Media" *Env. Sci. Tech.* 46(13) (2012) pp. 7011-7017.
Thanikaivelan, et al. "Collagen based magnetic nanocomposites for oil removal applications" *Sci. Rep.* 2(230) (2012) pp. 1-7.
Tri, P.M. "Surface Functionalized Nano Magnetic Particles for Wastewater Treatment: Removal of Heavy Metal" *National University of Singapore* (2008) pp. 1-121.
University of Tasmania, Australia (UTAS), Copepoda, Feb. 4, 2013.
Venkatanarasimhan, et al. "Epoxidized natural rubber-magnetite nanocomposites for oil spill recovery" *J Mater. Chem. A* 1(3) (2013) pp. 868-876.
Weber, et al. "Methods for measuring the acute toxicity of effluents and receiving waters to freshwater and marine organisms" EPA/600/4-90/027F *U.S. Environmental Protection Agency* (1993) pp. 1-273.
Wei, et al. "Evaluation of nonwoven polypropylene oil sorbents in marine oil-spill recovery" *Mar. Pollut. Bull.* 46(6) (2003) pp. 780-783.
Xia, et al. "Lessons from the Exxon Valdez Oil Spill disaster in Alaska" *Disaster Advances* 3(4) (2010) pp. 270-273.
Yuan, et al. "Superwetting nanowire membranes for selective absorption" *Nature Nanotechnology* 3(6) (2008) pp. 332-336.
Zhang, et al. "Superparamagnetic iron oxide nanoparticles prepared by using an improved polyol method" *Appl. Surf. Sci.* 266 (2013) pp. 375-379.
Zhang, et al. "Synthesis of PVP-coated ultra-small $Fe_3O_4$ nanoparticles as a MRI contrast agent" *J Mater Sci: Mater Med* 21 (2010) pp. 1205-1210.
Zhu, et al. "A simple method to synthesize modified $Fe_3O_4$ for the removal of organic pollutants on water surface" *Appl. Surf. Sci.* 258(17) (2012) pp. 6326-6330.
Zhu, et al. "Fast and Selective Removal of Oils from Water Surface via Highly Hydrophobic Core-Shell $Fe_2O_3@C$ Nanoparticles under Magnetic Field" *Appl. Mater. Interf.* 2(11) (2010) pp. 3141-3146.

\* cited by examiner

METHODS FOR THE AMELIORATION OF OIL TOXICITY AND STIMULATION OF BACTERIAL OIL DEGRADATION

CROSS REFERENCE TO RELATED APPLICATION

This application is a Continuation Application claiming priority to U.S. application Ser. No. 16/466,853, now issued as U.S. Pat. No. 11,814,308, having a national stage entry date under 35 U.S.C. § 371 of Jun. 5, 2019, entitled "Nanoparticles for the Amelioration of Oil Toxicity and Stimulation of Bacterial Oil Degradation," which is the US national stage entry of PCT International Patent Application Serial No. PCT/US2017/064884, having a filing date of Dec. 6, 2017, entitled "Amelioration of Oil Toxicity to a Marine Estuarine Meiobenthic Copepod and Increased Oil Degradation by Bacterial Stimulation using PVP-Coated Magnetite Nanoparticles," which claims filing benefit of U.S. Provisional Patent Application Ser. No. 62/430,438, having a filing date of Dec. 6, 2016, entitled "Amelioration of Oil Toxicity to a Marine Estuarine Meiobenthic Copepod and Increased Oil Degradation by Bacterial Stimulation using PVP-Coated Magnetite Nanoparticles," all of which are incorporated herein by reference for all purposes.

BACKGROUND

Catastrophic oil spills like the Deepwater Horizon (2010, 210 million gallons), first Gulf War (1990, 420 million gallons), Exxon Valdez (1989, 11 million gallons), and IXTOC 1 (1979, 140 million gallons) are major environmental threats. Significant damage to the marine ecosystem is visible in the form of dead sea birds, otters, sea turtles, marine mammals, contaminated planktons, and affected corals. Additionally, oil in bilge water, industrial oil spills from facility repairs, and daily normal operation are constant sources of pollution. Another potential environmental hazard comes from waste waters produced via fracking. Modern extraction techniques like directional drilling and hydraulic fracking are frequently used to access natural gas trapped in shale reserves. The hydrocarbon-mixed water associated with shale gas-extraction significantly affects contaminant level in nearby wells and aquifers. The long-term detrimental impact of different oil contaminations on the food-chain is a huge concern.

To mitigate the harmful environmental effect of fast spreading oil spills, rapid removal of oil from the water surface is important. Currently, several techniques are used for removing spilled oil in aquatic systems including barriers, skimmers, sorbents, in situ burning, dispersants, and biological methods. However, each of these techniques has limitations. For example, barriers are not easy to dispose of and may be inefficient at oil removal. Skimmers are limited by marine conditions such as wind speed, waves and currents, and do not always function optimally. Sorbents are inefficient and disposal is expensive. In-situ burning has the potential to cause problems due to atmospheric pollution and to adversely affect climate change. In addition, burning is not always feasible even for surface oil. Dispersants will increase the concentration of oil components such as polycyclic aromatic hydrocarbons (PAHs) in the water column and can increase toxicity to aquatic organisms. Although biological methods may completely degrade oil, it is generally a slow process, taking months to occur. Due to these limitations of currents techniques, new technologies including nanotechnology have been developed.

Nanomaterials have at least one dimension in the size range of 1 to 100 nm and have novel or unusual size-dependent properties. They have been used in environmental remediation due to their efficiency and effectiveness and high specific surface area. Potentially they may be low cost, although there are still concerns regarding toxicity and other issues. Additionally, iron oxide nanomaterials have attracted extensive interest for various applications due to their unique properties such as superparamagnetism and easy synthesis. Although engineered iron oxide nanomaterials have been developed and tested, there are many remaining problems of applicability and feasibility including costs and scale-up. There are no known studies assessing either i) the environmental toxicity of nanomaterials used for oil remediation to the aquatic organisms to which they will be exposed during remediation or ii) their effectiveness in reducing ecotoxicity of oil.

Recently, polyvinylpyrrolidone (PVP)-coated iron oxide nanomaterials have been used to remediate oil-contaminated waters successfully, such as polyvinylpyrrolidone-coated iron oxide nanomaterials described in U.S. Patent Application Publication No. 2015/0298993 to Lead, et al. and U.S. Provisional Patent Application Ser. No. 62/300,975 to Lead, et al. (the disclosures of which are incorporated by reference herein). These disclosures describe methods for removal of oil from water, either magnetically or using flow through cartridges.

A need exists for reducing the toxicity of the oil in the environment, especially in the event that the oil cannot be removed, and for complete in-situ degradation of the oil.

SUMMARY

According to one embodiment, a method for detoxifying a multiphasic liquid is described. The multiphasic liquid can include an oil, water, and an oil-degrading bacteria. The method includes introducing a plurality of nanomaterials to the multiphasic liquid. The nanomaterials include a core and a polymeric shell. Upon the introduction of the nanomaterials to the multiphasic liquid, oil in the multiphasic liquid can adsorb to the polymeric shell and the oil-degrading activity of the bacteria in the liquid can be stimulated. The adsorption of the oil by the nanomaterials combined with the bacterial stimulation in the liquid can ameliorate toxicity of the liquid. For instance, the method can ameliorate toxicity of the oil to organisms in the liquid (e.g., meiobenthos organisms such as planktonic copepods in the liquid).

In one embodiment, a method can also include introducing the oil-degrading bacteria to the multiphasic liquid, e.g., prior to, in conjunction with, or following introduction of the nanomaterials to the multiphasic liquid.

Disclosed methods can improve environmental clean-up and recovery efforts, for instance in the case of an oil spill.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
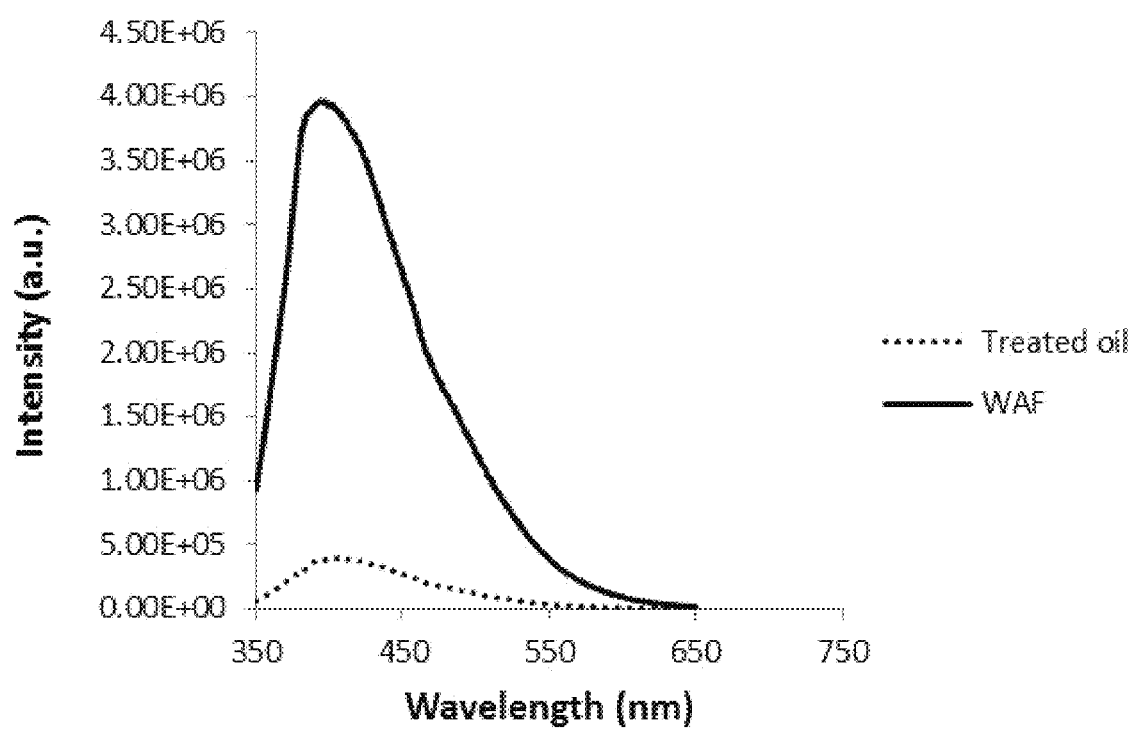
FIG. 1 presents fluorescence spectra of the water accommodated fraction (WAF) sample and WAF after nanomaterial addition (18 ppm) and oil removal after 40 minutes using magnetic separation.

Repeat use of reference characters in the present specification and drawings is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only and is not intended as limiting the broader aspects of the present invention, which broader aspects are embodied exemplary constructions.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "nano" refers a scale of about 1 nm to about 100 nm. For example, particles having an average diameter on the nanometer scale (e.g., from about 1 nm to about 100 nm) are referred to as "nanomaterials." Particles having an average diameter of greater than 1,000 nm (i.e., 1 μm) are generally referred to as "microparticles," since the micrometer scale generally involves those materials having an average size of greater than 1 μm.

As used herein, the term "polymer" generally includes, but is not limited to, homopolymers; copolymers, such as, for example, block, graft, random, and alternating copolymers; terpolymers; and blends and modifications thereof. Furthermore, unless otherwise specifically limited, the term "polymer" shall include all possible geometrical configurations of the material. These configurations include, but are not limited to, isotactic, syndiotactic, and random symmetries.

Methods are generally provided for using nanomaterials to detoxify a multiphasic liquid (e.g., an oil-water mixture) and in particular to ameliorate the toxicity of an area to local organisms, e.g., meiobenthos in or near the multiphasic liquid. The application can be utilized in one embodiment for oil recovery and environmental clean-up and detoxification after spills and discharges. Subsequent recovery of oil following the separation of the oil from the multiphasic liquid can be carried out in some embodiments. Generally, disclosed methods are directed to oil removal, and not merely oil dispersion, with the potential for oil recovery and environmental cleanup through utilization of low toxicity nanomaterials that can be formed through a facile, inexpensive synthesis process using low energy and material inputs. Moreover, through synergistic combination of core/shell nanomaterials with oil degrading bacteria, disclosed methods can ameliorate environmental damage due to the presence of the multiphasic liquid.

Disclosed methods are applicable to multiphasic liquids having an oil concentration at any level, and are particularly relevant to environmental oils spills. Beneficially, the materials can function effectively under a wide array of environmental conditions including, and without limitation to, high salinity conditions (e.g., seawater salinity), the presence of natural organic macromolecules such as humic substances, wide temperature variation, etc. Moreover, the methods can utilize materials that are generally resistant to dynamic changes in the environment due to, for example, oxidation, sulfidation, aggregation, eco-corona formation, etc.

The nanomaterials can include individual particles that include a core and polymeric shell, examples of which have been each described, for instance in U.S. Patent Application Publication No. 2015/0298993 to Lead, et al., previously incorporated by reference herein.

The nanomaterials can include particles having any shape. For example, the core/shell particles can have a core surrounded by a polymeric shell to form a spherical nanoparticle, a nanoflake (e.g., a flat, plate-like structure), a nanorod (e.g., a nanoparticle having an aspect ratio of greater than 1), etc.

I. Nanoparticle Core

A variety of different materials can be utilized in forming the nanoparticle cores. The nanoparticle may comprise, for example, natural or synthetic nanoclays (including those made from amorphous or structured clays), inorganic metal oxides, nanolatexes, organic nanomaterials, etc. In some embodiments, the nanoparticle cores can include inorganic materials, such as, and without limitation to, iron oxide, silica, alumina, a titanium oxide, indium tin oxide (ITO), CdSe, etc., or mixtures thereof. In some embodiments, the nanoparticle cores can include organic materials such as, and without limitation to, polymers, carbon, graphite, graphene, carbon nanotubes, virus nanomaterials, etc., or mixtures thereof.

The nanoparticle core can include multiple layers. For instance, in one embodiment, the nanoparticle core can include an inner core with a surrounding shell that completely or partially surrounds the inner core. For example, the nanoparticle core can include an inner core of a first metal (e.g., a Au core) and a shell of a second metal (e.g., a silver shell).

In one embodiment, the nanoparticle core can include a metal oxide. For instance, and without limitation, the nanoparticle core can include one or more of iron oxide, silica, aluminum oxide (e.g., alumina), copper oxide, zinc oxide, indium tin oxide, titanium oxide, nickel oxide, cobalt oxide, or mixtures thereof. Metal oxides can be in any form of the combination of the metal, oxygen, and optionally another element (e.g., another metal). For example, suitable iron oxides can include one or more of iron(II) oxide (FeO), iron(II,III) oxide ($Fe_3O_4$ or $Fe_4O_5$), iron(III) oxide ($Fe_2O_3$), etc. Titanium oxides can include titanium dioxide ($TiO_2$), titanium(II) oxide (TiO), titanium(III) oxide ($Ti_2O_3$), etc. Likewise, suitable copper oxides can include cuprous oxide ($Cu_2O$), cupric oxide (CuO), etc.

By way of example, an iron oxide core can have a diameter between about 1 nm and about 100 nm, and can be formed primarily of magnetite ($Fe_3O_4$) and its oxidized form, maghemite ($\gamma$-$Fe_2O_3$). Such iron oxide cores can have superparamagnetic properties (a.k.a., SPIONs) that can be particularly suitable in some embodiments.

In one embodiment, the core can include a magnetic material (e.g., a magnetite iron oxide, nickel oxides, cobalt oxides, etc.). Among other benefits, a magnetic core can be useful in separation/removal/extraction of the nanoparticle from the remaining multiphasic liquid following adsorption of oil to the nanoparticle, e.g., via relatively simple contact of the mixture of the nanomaterials with the multiphasic liquid with a suitable magnetic field following desired contact time. Of course, other suitable materials can be utilized that can utilize alternatively separation schemes (e.g., sieving).

In some embodiments the core can have an average diameter of about 100 nm or less, such as about 15 nm to about 50 nm. A relatively small size can be desired in some embodiments so as to provide a total high surface area for the core/shell nanomaterials, which can improve oil adsorption capabilities.

A nanoparticle core can include a single monolithic nanoparticle or an agglomeration/aggregation of smaller nanomaterials. For instance, a core can have an average diameter of about 15 nm to about 50 nm when the core includes relatively few nanomaterials (e.g., 1 to about 10 smaller nanomaterials). The core can be larger when the core is an agglomeration of a larger number of nanomaterials (e.g., an average core diameter of about 50 nm to about 500 nm when the core is formed from a plurality of smaller nanomaterials). Of course, the nanoparticle core can be formed of a single relatively large nanoparticle (e.g., a single nanoparticle or from about 50 nm to about 500 nm) or any number of agglomerated smaller nanomaterials that together form a core that can then be encapsulated in a single shell. For instance, a core can include a single crystal (i.e., a single structure including a regular 3D arrangement of atoms), one or more particles (e.g., a single non-crystalline particle or multiple associated crystals), or particles formed from agglomerates or aggregates that can be either weakly or strongly bonded to one another.

Methods for forming a single core of an agglomeration or aggregation of smaller nanomaterials are known. For instance, agglomeration of smaller nanomaterials to form a single core can be increased somewhat in the presence of oil and in high ionic strength solutions.

II. Polymeric Nanoparticle Shell

The core/shell nanoparticle can include a shell formed of a polymeric material. The polymeric shell is generally positioned around all or a portion of the nanoparticle core, so as to form a core-shell nanoparticle. The polymeric shell can surround all or a portion of a core that, in turn, can include a single nanoparticle, an agglomeration of nanomaterials, or a smaller core/shell nanoparticle that includes an inner core.

In one embodiment, the polymeric shell can have a wall thickness (i.e., a radial distance from an inner surface that abuts the core to an outer surface of the shell) of from about 1 nm to about 50 nm.

The polymeric shell can be chemically bonded to the core (e.g., covalent or non-covalent bonds between a material of the core and a material of the shell), and/or may be mechanically bonded (e.g., electrostatic interaction, friction bonding, coordinative interactions, etc.) around the core depending on the interaction between the particular polymeric material utilized and the particular core present.

The polymeric shell is formed from a polymeric material that includes at least one polymer. In one embodiment, the polymeric shell can include a polyvinylpyrrolidone-based polymeric material that includes a polyvinylpyrrolidone-based polymer (PVP) either alone or in conjunction with another polymer and/or other materials as known in the art. For example, a PVP-based polymeric material can include about 50% by weight or more of a PVP-based polymer, such as about 75% to 100% by weight in some embodiments. In one embodiment, a PVP-based polymeric material that forms the shell can be at least 90% by weight of a PVP-based polymer, such as about 95% to 100% by weight of a PVP-based polymer in some embodiments. A PVP-based polymer can include PVP homopolymer as well as copolymers (e.g., a random, block, or graft copolymer) or derivatives thereof. As utilized herein the term PVP derivative generally refers to a polymer that includes a backbone based at least in part on the PVP homopolymer structure. For example, and without limitation, examples of a PVP-based polymer include poly(vinyl pyrrolidone/vinylacetate), poly(vinyl pyrrolidone/vinylcaprolactam), poly(1-vinylpyrrolidone-co-2-dimethylaminoethyl methacrylate), poly(1-vinylpyrrolidone-co-styrene), and poly(1-vinylpyrrolidone)-graft-(1-triacontene).

In general, a PVP polymer can have a molecular mass (number average molecular weight) of from about 10 kDa to about 360 kDa. In some embodiments, a PVP polymer can have a molecular mass at the lower end of the range (e.g., about 10 kDa to about 200 kDa). Lower molecular weight polymers can be utilized in some embodiments as they can exhibit higher capacity for oil adsorption as compared to larger polymers.

A PVP-based polymer can be utilized alone (i.e., without other components in the polymeric material) to form the shell, or can be a component in a mixture including the PVP-based polymer in conjunction with one or more polymers in a blend and/or with other materials (e.g., dyes, stabilizers, plasticizers, etc.). In general, any polymer having aliphatic and aromatic hydrocarbon structure or similar to that of hydrocarbons can be combined with a PVP-based polymer in forming a PVP-based polymeric shell.

In one embodiment, a PVP-based polymeric shell can be formed through a reaction process utilizing an aqueous solvent and at reaction temperatures of less than about 100° C. (e.g., about 60° C. to about 95° C.). By using the (1)

aqueous solvent and (2) the lower reaction temps, the reaction can be more environmentally friendly and need not require organic solvents. This can be beneficial from an environmental stand point and can also reduce costs.

III. Amelioration of Toxicity of a Multiphasic Liquid

In utilizing the core/shell nanomaterials, a plurality of the nanomaterials can be introduced to a multiphasic liquid. The multiphasic liquid can include an oil and a liquid that is immiscible with the oil, e.g., an aqueous liquid. For example, the multiphasic liquid can include oil and sea water (such as sea water in an area of an oil spill), oil and fresh water, or other multiphasic liquids including an oil component. In one embodiment, the multiphasic liquid can include a crude oil. Crude oil refers to a mixture of compounds that can be categorized into four fractions: (1) saturates (or alkanes); (2) aromatics, including for example benzene, toluene, ethylbenzene and xylenes, and polyaromatic hydrocarbons (PAHs); (3) resins, which are compounds containing nitrogen, sulfur, and oxygen, that are dissolved in oil; and (4) asphaltenes, which are large and complex molecules that are colloidally dispersed in oil. The relative proportions of these fractions in the crude oil are dependent on many factors, including for example source, age, and migration.

The multiphasic liquid can also include bacteria that can be present in the liquid or can be added to the liquid in conjunction with or separate from the core/shell nanomaterials. In one particular embodiment, bacteria added to or present in the multiphasic liquid can be hydrocarbon-degrading bacteria as are known in the art.

The hydrocarbon-degrading bacteria can assimilate and metabolize hydrocarbons that are present in the oil component of the multiphasic liquid. Without wishing to be bound to any particular theory, it is believed that the combination of the nanomaterials with the oil degrading bacteria can stimulate the activity of the oil degrading bacteria and improve detoxification efforts in the area. For instance, the toxicity of a multiphasic liquid to organisms in the liquid (e.g., meiobenthos organisms such as planktonic copepods).

The oil-degrading bacteria can be naturally occurring in the environment in which the multiphasic liquid is present or can be natural or genetically modified bacteria that can be added to the multiphasic liquid in conjunction with or separately from the nanomaterials. Examples of oil-degrading bacteria encompassed herein include *Rhodococcus* spp. are the most abundant alkane-degrading bacteria, and *Pseudomonas* spp. and *Alcanivorax borkumensis* may become enriched following contamination events such as crude oil spills.

The last few decades have seen the discovery of a number of bacteria capable of degrading polycyclic aromatic hydrocarbons (PAHs), particularly low-molecular-weight compounds (e.g., two- and three-ring PAHs such as naphthalene and phenanthrene). Most of these bacteria belong to the genus *Agmenellum*. Other bacteria that can degrade higher-molecular-weight PAHs (four- and five-member fused aromatic rings), such as fluoranthene, pyrene, and benzo(a)pyrene include members of the genera *Bacillus* and *Mycobacterium*. *Marinobacter* is a genus of Proteobacteria found in sea water that includes oil-degrading bacteria encompassed herein. Examples of species involved in hydrocarbon degradation that can be utilized in conjunction with the nanomaterials include, without limitation to, *M. alkaiphilus, M. arcticus, M. hydrocarbonoclasticus, M. maritmus,* and *M. squalenivorans*. Other oil degrading bacteria encompassed herein include, without limitation, *Halomonas* sp. and *V. gazogenes*.

Disclosed methods may encompass any such oil-degrading bacteria. Combination of the nanomaterials with the oil-degrading bacteria is believed to improve efficiency of the natural bioremediation process and decrease toxicity of the multiphasic liquid to organisms in the area of the liquid. While not wishing to be bound to any particular theory, it is believe that the bacteria may utilize oil as a carbon and energy source and the presence of the carbon in conjunction with components of the nanomaterials (e.g., iron) that are also essential can encourage activity of the bacteria. Additionally, PVP-coated iron oxide NPs may contribute a role to the oil-degrading bacteria by collecting hydrocarbons from the surrounding water and bringing them into direct contact with bacteria in a form that is more bioavailable. Whatever the exact mechanism, beneficially, degradation of the oil is much more effective in the presence of the nanomaterials as described further in the Examples section herein.

In one embodiment, the nanomaterials can be added into (e.g., floated on, submerged within, dispersed and/or suspended therein, etc.) the multiphasic liquid in conjunction with the oil-degrading bacteria. Such an introduction can be particularly useful in large, natural bodies of water (e.g., an ocean, gulf, lake, river, groundwater, etc.). For example, a large plurality of nanomaterials can be introduced to an area of an oil spill in a natural body of water. The area can also naturally present oil-degrading bacteria or the bacteria can be introduced to the multiphasic liquid either together or separately with the nanomaterials. Then, after a sufficient contact time to allow the multiphasic liquid to be adsorbed by the polymeric shell, the nanomaterials can be removed from the multiphasic liquid. For example, the multiphasic liquid can be passed through a filter to remove the nanomaterials. Alternatively, if using a nanoparticle having a magnetic core, the multiphasic liquid can be exposed to a magnetic field to remove the nanomaterials. For example, a magnet can be placed near the multiphasic liquid with the nanomaterials such that the nanomaterials are magnetically attracted to the magnet and removed from the multiphasic liquid. The nanomaterials can also be physically or chemically bound to a surface, such that removal of the surface will remove the nanomaterials and associated oil.

IV. Recovering the Oil Adsorbed by the Polymeric Shell

The oil adsorbed from the multiphasic liquid can be recovered from the collected nanomaterials after removal from the multiphasic liquid. For example, a sonication or solvent extraction method can be utilized to remove the oil from the collected nanomaterials, which indicates that the oil is held by the PVP-based polymer through non-covalent bonding.

The combination of the core/shell nanomaterials to natural systems containing relevant oil-degrading bacteria can minimize toxicity to marine organisms due to the presence of a multiphasic liquid and stimulate rapid biodegradation of oil in the multiphasic liquid.

The present invention may be better understood with reference to the Examples set forth below.

EXAMPLES

PVP-coated iron oxide nanomaterials were found to provide dual benefits. First, the toxicity of oil was significantly reduced by the use of PVP-coated iron oxide nanomaterials to an estuarine sediment-dwelling copepod, specifically through attenuation of WAF-induced toxicity. Second, the nanomaterials stimulated the growth of oil degrading bacteria (e.g., *Marinobacter* sp.), which in turn rapidly and completely mineralized oil of the multiphasic liquid.

Iron oxide nanoparticles were synthesized by using a hydrothermal method in ambient air, such as described in U.S. Patent Application Publication No. 2015/0298993 of Lead, et al. Briefly, PVP (Mw 10 kDa, 0.18 mM, Sigma-Aldrich) was added first to 6.25 mL ultrapure water (Millipore) and stirred at 80±5° C. Both 1 mM $FeCl_2 \cdot 4H_2O$ (98%, Alfa Aesar) and 4 mmol $FeCl_3 \cdot 6H_2O$ (>98%, BDH) were added at the same time to the solution and stirred at 80±5° C. for a further 10 minutes. Then, 0.12 mM PVP was added into the mixture. Finally, 6.25 ml ammonium hydroxide (28-30%, BDH) was added dropwise into the solution at 80±5° C. with stirring and the color turned immediately from yellow to black. This solution was stirred for 25 minutes at 90±5° C. The suspensions were separated magnetically and washed with deionized water (DI). Then, the suspension was re-dispersed in DI water again by sonication. The nanomaterial solution was kept at 4° C. for further use.

Characteristics of the PVP-coated iron oxide nanomaterials were measured by a multi-method approach and their characteristics are summarized as follows: The diameter and morphological features of the nanomaterials were observed by atomic force microscopy (AFM) and dynamic light scattering (DLS). On the basis of the AFM results, the median particle size was 11.2 nm. The hydrodynamic diameter was 127.4±4.2 nm as measured by DLS. The average zeta potential was 11.2±0.6 mV. Total iron concentration was 18 ppm as measured by using inductively coupled plasma-optical emission spectrometer (ICP-OES; Varian 710-ES), after removal of residual dissolved Fe.

Crude oil, representative of BP Deepwater Horizon spill (reference MC252 surrogate oil; sample ID: A0068H, Aecom Environment) was used to prepare the oil-water mixtures. The WAF was produced according to previously reported procedures. In brief, 60 ml of 0.22-μm filtered seawater (30 ppt) were placed in an amber round-bottomed glass flask (250 ml). Then 2 ml of the reference oil was added to the seawater. The glass bottle was covered and sealed by para-film to prevent volatilization. The bottle was placed in a shaking incubator (Innova® 44—Eppendorf) for 36 hours at 20±1° C. The suspension was then left to settle for 3 hours. The WAF was defined as the aqueous phase (containing 'dissolved' oil), and this fraction was placed in a clean, covered glass flask and stored at 4° C. for further use. The synthetic seawater solutions were prepared based on the U.S. Environmental Protection Agency protocol (EPA-821-R-02-012) 26. To better mimic natural conditions, fulvic acid and alginic acid (each at 0.5 ppm) were separately added to the synthetic seawater in further experiments.

Oil separation tests were conducted. In brief, PVP-coated iron oxide nanomaterials (18 ppm) were added to WAF and mixed for 5 minutes by sonication. One hour of magnetic separation (magnets of Grade N 52, K&J Magnetics Inc.) was used to remove the nanomaterials (with sorbed oil) from the seawater. The remaining water was collected for further measurements using fluorescence spectroscopy. Emission spectra of WAF were measured on a Horiba Jobin Yvon Fluorolog-3 spectrofluorometer. The excitation wavelength 337 nm and emission range between 350 and 650 were used to record the samples. This excitation wavelength has been widely reported to detect PAHs in crude oil.

Copepod Toxicity

The test organism, *Amphiascus tenuiremis*, is a model sediment-dwelling harpacticoid copepod that lives in muddy estuarine systems and is widely distributed from the Baltic Sea to the southern Gulf of Mexico. It is culturable in sediments or seawater alone and thus is an ideal organism to test for the effects of sediment and waterborne contaminants. Copepods were collected from laboratory sediment and seawater cultures by aspirating 50 ml and gently sieving. The copepodite fraction, collected on 90 μm sieves, was used in all exposures.

For toxicity tests, all exposures were conducted following OECD guidelines. Petri dishes of *A. tenuiremis* were incubated at 25±1° C. (Revco, Asheville, NC, USA) for four days, and monitored daily by visual inspection to assess mortality. Each dish contained 5 mL of sterile-filtered oxygenated seawater (30 ppt) and toxicant of interest. Each experiment was run in triplicate and each plate contained ten copepods. The copepods were monitored daily, not fed during the test period and were exposed to different concentrations of nanomaterials and WAF either separately or together. Nanomaterial concentrations were between 0 and 100 ppm. For WAF and nanomaterial exposures, the WAF concentration was 100% and the nanomaterial concentration was 18 ppm. Two sets of experiments were performed. First, the nanomaterials were added over time at 0, 24, 48 and 72 hours (where T=0 was point of WAF addition). Second, the nanomaterials were added to the mixture and, along with bound oil, magnetically removed from the aqueous sample. The exposure was then continued.

Bacterial Degradation

To prepare the oil-water mixtures, the crude oil was mixed well with filtered seawater (30 ppt) in 250-mL Erlenmeyer flask via sonication (Branson 2800, 40 kHz, ambient conditions) for one hour to prepare the oil sample for the oil removal/degradation experiments. Oil concentration was 375±10 mg $L^{-1}$. These concentration values are substantially higher than the concentrations used for remediation with nanomaterials and no bacteria.

Bacterial strains used in experiments included: (1) *Halomonas* sp isolated from oil contaminated soil obtained from Fort Jackson (Columbia, SC, USA 33° 59N 80° 1"W). The strain was identified by 16S rRNA gene sequencing and analysis (2) the marine bacterium, *Vibrio gazogenes* (ATCC43942), previously isolated from an estuarine system (Georgetown, SC, USA 33° 20N 79° 10 W), and having a 98.7% 16S rRNA sequence similarity to the original type strain, *Vibrio gazogenes* (ATCC 29988). *Marinobacter hydrocarbonoclasticus* SP17 (ATCC 49840) strain was chosen for its ability to degrade oil hydrocarbons and its common presence in marine environment.

To examine the degradation of oil, each strain was grown in 250 ml Erlenmeyer flasks containing 50 ml of total media, containing 9.3 g $L^{-1}$ marine broth 2216 (Difco Laboratories, Detroit, Mich.), with oil at 375 mg $L^{-1}$, PVP-coated iron oxide nanomaterials 18 mg $L^{-1}$ or both. The media were inoculated simultaneously with 2 ml of cell suspensions of either *Halomonas* sp., *V. gazogenes* or *M. hydrocarbonoclasticus* SP17 having a density of $1 \times 10^6$ cells $mL^{-1}$. Then, cultures were incubated at 28° C. for 48 hours while shaking (Excella E24, New Brunswick Scientific, Edison, NJ) (180 rpm). All experiments were carried out in triplicate. Residual oil was quantified by GC-MS on an Agilent 6890N gas chromatography system or an Agilent 5975 mass spectrometer equipped with an auto sampler (Agilent 7683B) as described in previous study (Mirshahghassemi and Lead, 2015). The analytical GC column was an Agilent TG-5MS (30 m×0.25 mm I.D., 0.25 μm film thickness) coated with 5% phenylmethylsiloxane stationary phase. High-purity helium (99.9%) at a constant flow rate of 1.5 mL $min^{-1}$ was used as the carrier gas. 1 μL of extracted sample was injected; with the injection port maintained at 250° C. in the splitless mode. Spectra were obtained in the electron impact mode (70 eV) scanning from 40 m/z to 400 m/z. The oven temperature was operated from 40° C. to 300° C. rising at 10° C. min$^{-1}$. Saturated hydrocarbons were monitored in the oil samples before and after the bacterial growth and before and after NPs separation.

Nanomaterials and WAF was assessed over 4 days. Poisson regression with robust standard errors 33 was used to estimate relative risk along with 95% confidence intervals after adjusting for potential confounding variables. SAS version 9.3 was used for all statistical analyses (SAS Institute, Cary NC).

Results and Discussion

Oil removal from WAF: FIG. 1 shows the fluorescence spectra for the WAF after adding and separating the nanomaterials. The data showed essentially 100% removal of oil components using 18 ppm nanomaterials and a separation time of 40 minutes. These data are in full agreement with previous work and show complete removal of the oil by the nanomaterials. Importantly only 40 minutes was required for quantitative oil removal, which is much less than the 4-day copepod exposure period over which toxicity was assessed.

Copepod Toxicity

Figure 2:
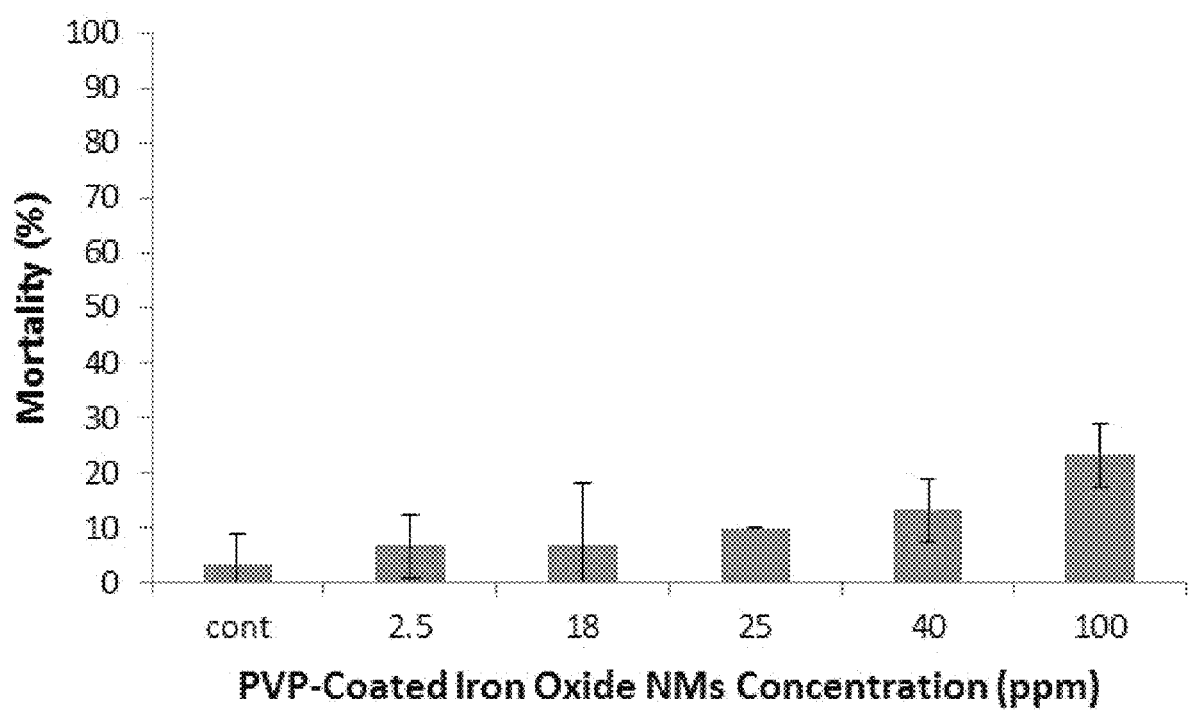
FIG. 2 presents mortality of copepods when exposed to different concentrations of PVP-coated iron oxide nanomaterials. No significant toxicity was observed at concentrations up to 25 ppm.

FIG. 2 shows the PVP-coated iron oxide nanomaterials had no significant effect on mortality of the copepod *A. tenuiremis* at concentrations substantially higher than that used for oil removal and over substantially longer time periods. Results after four days of exposure showed no significant mortality compared to the control ($p<0.05$) at concentrations up to 25 ppm; 18 ppm was used for oil removal. Small but significant mortality was observed at concentrations of 40 and 100 ppm, although mortality never reached 50%, thus an LC50 was not calculated. No significant toxicity was observed at time periods before 4 days (data not shown). These results are in agreement with studies of similar but not identical PVP-coated iron oxide nanomaterials on *Daphnia magna*, which found no significant mortality up to 100 ppm. Additionally, in this study, agglomeration of PVP-coated iron oxide nanomaterials was observed by eye at concentrations above 40 ppm. At lower concentrations, little aggregation was observed suggesting that the nanomaterials will remain dispersed and within the water column for long periods of time (data not shown). These aggregates rapidly settled and did not remain in the water column. Aggregation most likely occurred due to bridging flocculation and polymer entanglement as has been previously speculated and may have resulted in higher doses (of agglomerates) to the copepods compared with the nominal concentrations.

Figure 3:
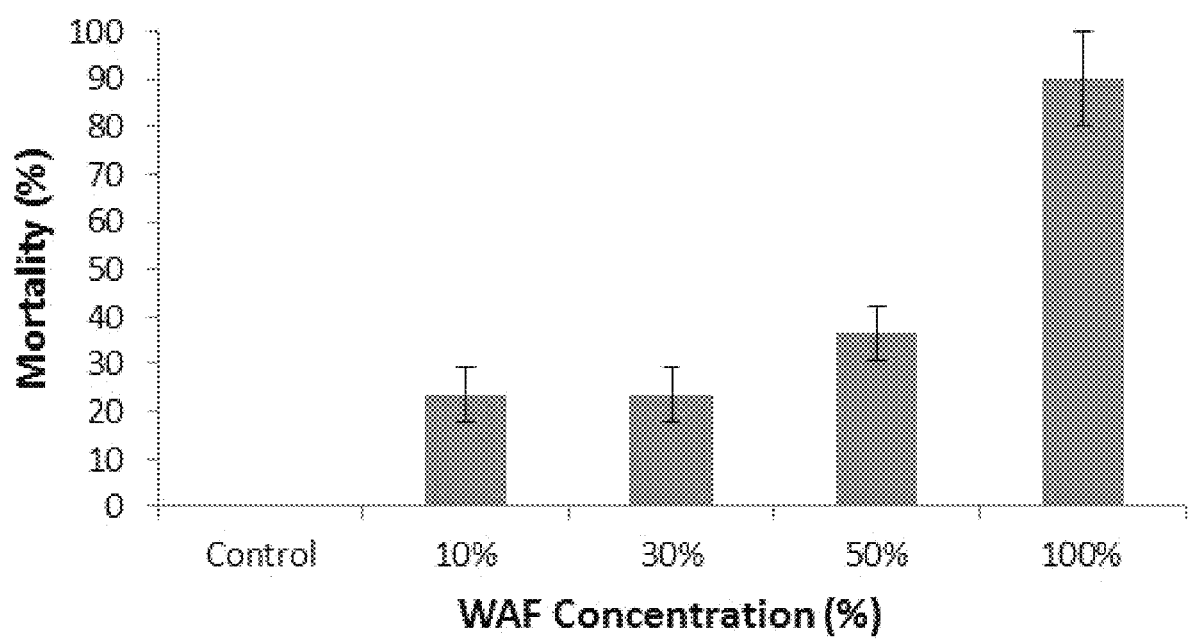
FIG. 3 presents copepod mortality when exposed to different WAF dilutions. The control was synthetic seawater 30 ppt.

*A. tenuiremis* was exposed to a dilution series of WAF. FIG. 3 shows the WAF had substantial and dose-dependent effects on copepod mortality, with 95±5% mortality upon exposure to the 100% WAF over four days. The probability of death for copepods estimated for 4 days exposure to 100% WAF was 3.9 times that of copepods in 10% WAF. Exposure to diluted WAF, down to a 10% dilution, caused observable reduction in copepod swimming ability and overall activity although this was not quantified. Previous studies have shown WAF exposure caused decreased swimming ability, a loss of balance, and death even after dilution.

Figure 4:
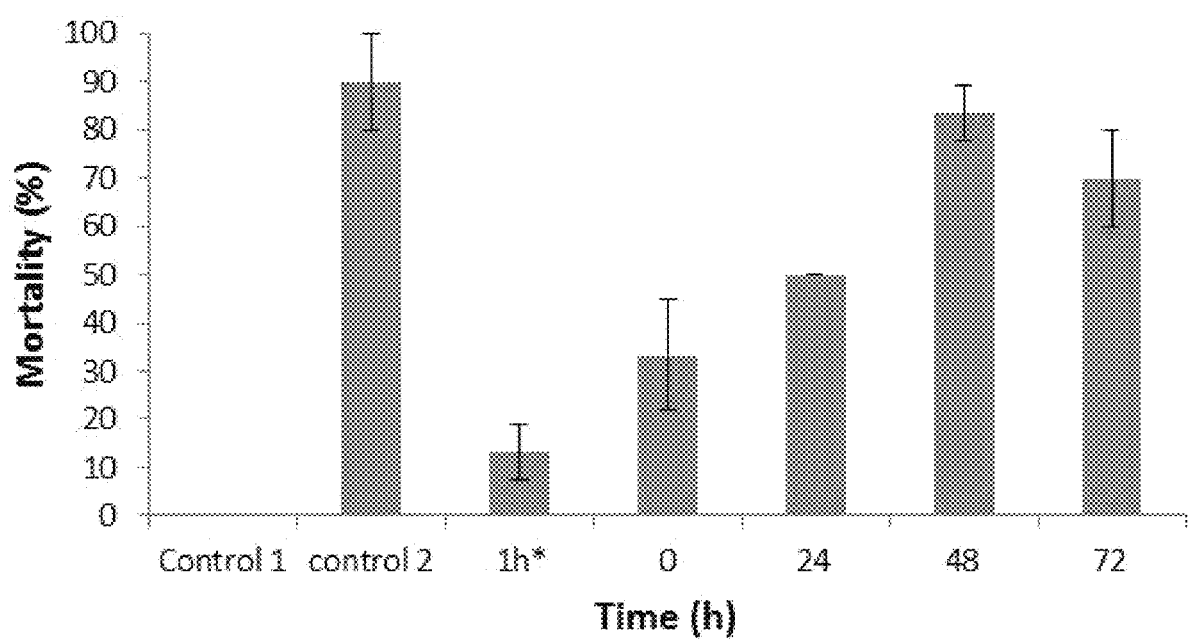
FIG. 4 presents copepod mortality when exposed to 18 ppm of PVP-coated iron oxide nanomaterials in 100% WAF over time. Two controls were used; control 1 contained 30 ppt seawater only; control 2 contained 100% WAF in seawater. The four treatments labeled 0, 24, 48 and 72 hours correspond to additions of nanomaterials at this time points to WAF and copepods in synthetic seawater. The *1 h when label relates to nanomaterial-facilitated removal of the oil after 1 hour.

FIG. 4 shows that the PVP-coated iron oxide nanomaterials decreased copepod mortality upon exposure to WAF. In the case of nanomaterial addition with the oil and magnetic removal of the nanomaterials with associated crude oil within 1 hour, mortality was reduced by approximately 90% ($p<0.01$). These data are of particular interest since these PVP-coated iron oxide nanomaterials can remove oil from the aqueous phase in less than one hour. This suggests that immediate addition of nanomaterials to oil spills and discharges could, in principle, mitigate essentially all of the observed oil toxicity. The explanation for the toxicity reduction can be because of the physico-chemical removal of essentially all of the oil, after sorption to the polymer coating and magnetic removal of the NM-oil complex (see FIG. 1). The data show effectiveness of oil removal from the sample which directly reduces oil toxicity.

FIG. 4 also shows the effect of leaving the nanomaterials in the WAF-containing media, rather than removing them—i.e., the oil is still physically present but now bound to the nanomaterials rather than being in the aqueous phase. The nanomaterials were added at time 0, 24, 48 and 72 hours after WAF addition and toxicity examined. A significant reduction in mortality of approximately 50% occurred when the nanomaterials were added to the WAF media immediately or after 24 hours, and then left in the sample with the WAF and copepods ($p<0.01$, $<0.01$ respectively). The reduced toxicity is most likely because nanomaterial-bound WAF components are less bioavailable and, thus, less able to cause toxicity. The design of the nanomaterials is therefore important in several aspects of its operation. First, at about 10 nm, the produced nanomaterials are sufficiently small to provide a very high specific surface area (SSA). Second, the size along with the appropriate polymer coating allows dispersion and persistence even in complex media such as marine waters with natural organic macromolecules and organisms. Third, the high SSA and polymer coating allows substantial oil sorption driven by the hydrophobic effect. Additionally, the size and other properties of the oil-nanomaterial complex minimize biological impact of the oil, likely through reduced bio-uptake.

There is a small but not statistically significant reduction in toxicity when the nanomaterials were added at or after 48 hours (p–$<0.06$). These data, if extrapolated, suggest that the rapid application of these nanomaterials to environmental oil spills, without subsequent removal, can result in a significant reduction in harm to the environment. The non-retrieval of these free nanomaterials from the environment once applied likely has significant cost advantages making the commercial application more appealing. In addition, other environmental benefits may accrue. For instance, our preliminary data (not shown) suggest that the combination of oil and nanomaterials stimulates the growth of bacteria partially responsible for oil degradation in marine systems.

Figure 5:
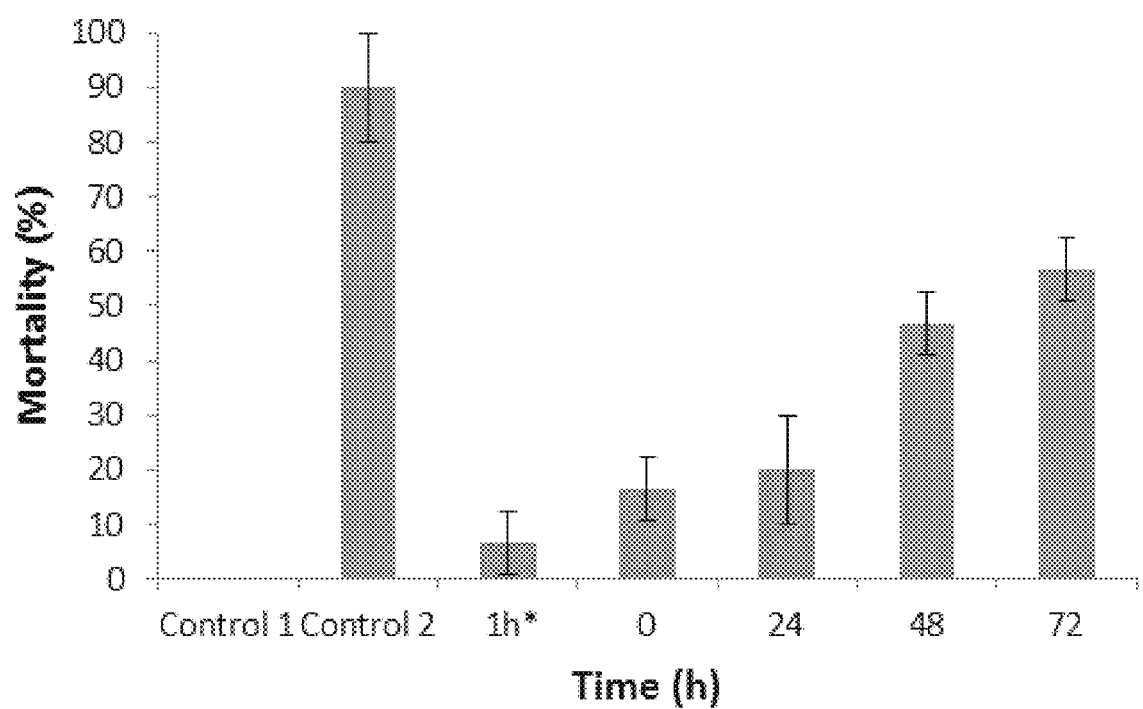
FIG. 5 presents copepod survival when exposed to 18 ppm of PVP-coated iron oxide nanomaterials in 100% WAF over time. Two controls were used; control 1 contained 30 ppt seawater only; control 2 contained 100% WAF in seawater. The four treatments labeled 0, 24, 48 and 72 hours correspond to additions of nanomaterials at this time points to WAF and copepods in synthetic seawater. The *1 h when label relates to nanomaterial-facilitated removal of the oil after 1 hour—a: with fulvic acid, b: with alginic acid.

To better mimic natural conditions, fulvic acid and alginic acid were separately added to the synthetic seawater and similar experiments performed. Both natural organic macromolecule types were added at 0.5 ppm, which is a relevant concentration for the marine environment. Results are shown in FIG. 5. With the addition of the natural organic macromolecules, oil toxicity was again reduced significantly (p–$<0.0002$) when the nanomaterials were added at 0 and 24 hours. In addition, a smaller but still significant toxicity reduction was observed after nanomaterial addition at 48 and 72 hours (p–$<0.0007$, $<0.0066$ respectively). It has previously been shown that natural organic macromolecules somewhat reduce the effectiveness of oil sorption onto the nanomaterial solid phase and higher nanomaterial concentrations are required for the same removal efficiency. In that work, it was suggested that the reduced effectiveness of the nanomaterial remediation was due to competitive binding of oil by natural organic macromolecule and/or an increased oil solubility in water, which consequently decreased oil sorption onto the nanomaterials. In this current work, nanomaterial concentration was kept constant, and therefore, this effect was not corrected for; the reduced toxicity of oil in the presence of natural organic macromolecules is likely due to the oil-natural organic macromolecule binding and the reduced toxicity of the oil-natural organic macromolecule complex compared to oil in the aqueous phase, despite the likely more limited nanomaterial-oil interactions. Nevertheless, the data indicate that under realistic environmental conditions these nanomaterials can be added to oil spills in marine systems within a short period of time and significantly reduce acute oil toxicity.

Bacterial Degradation

Figure 6:
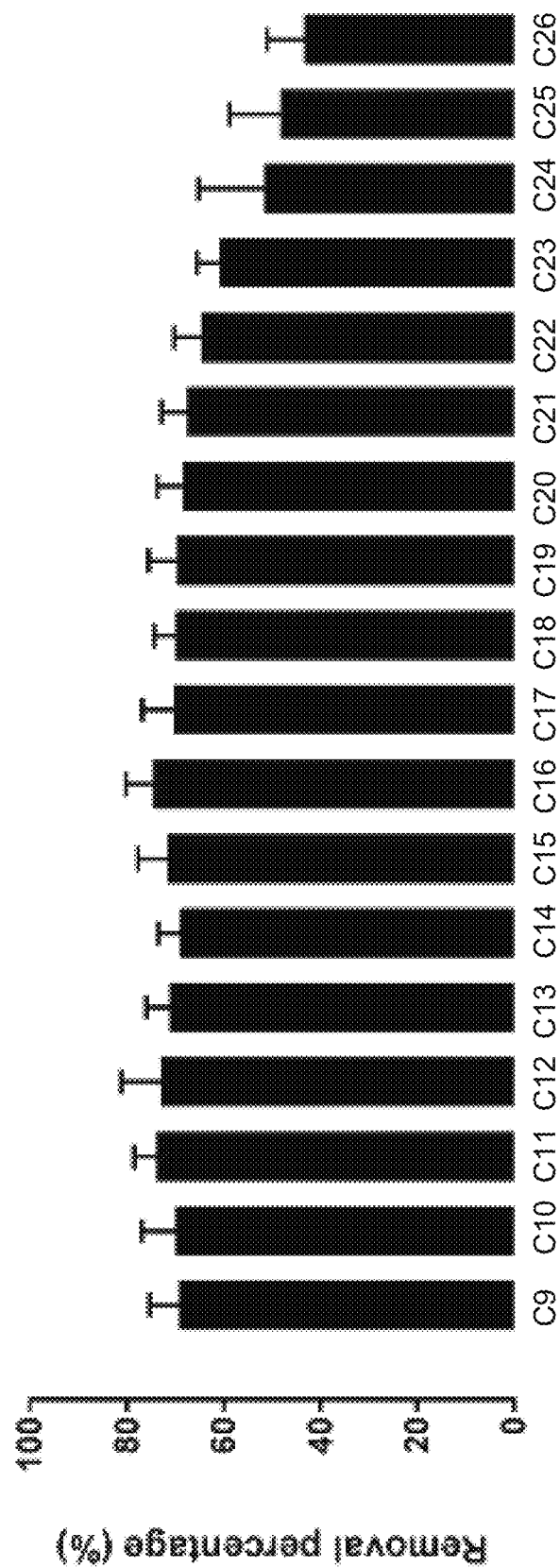
FIG. 6 presents gas chromatograph-mass spectrometer (GC-MS) results of n-alkane removal/degradation by PVP-coated iron oxide nanomaterials after 1 hour.

Oil removal was first tested using PVP-coated iron oxide nanomaterials only. The results indicated that approximately 70% of lower chain alkanes (C9-C22) and 65% of higher chain (C23-C26) were removed after one hour of magnetic separation (FIG. 6). The higher concentration was efficiently removed (approx. 67%), but with a lower efficiency than at the lower oil concentrations (approx. 100%) and the same nanomaterial concentrations, as might be expected. Nevertheless, oil removal efficiency was still very good, given the low nanomaterial concentrations. No time dependent increases in oil removal was observed, suggesting the nanomaterials were saturated with oil within 1 hour.

Figure 7:
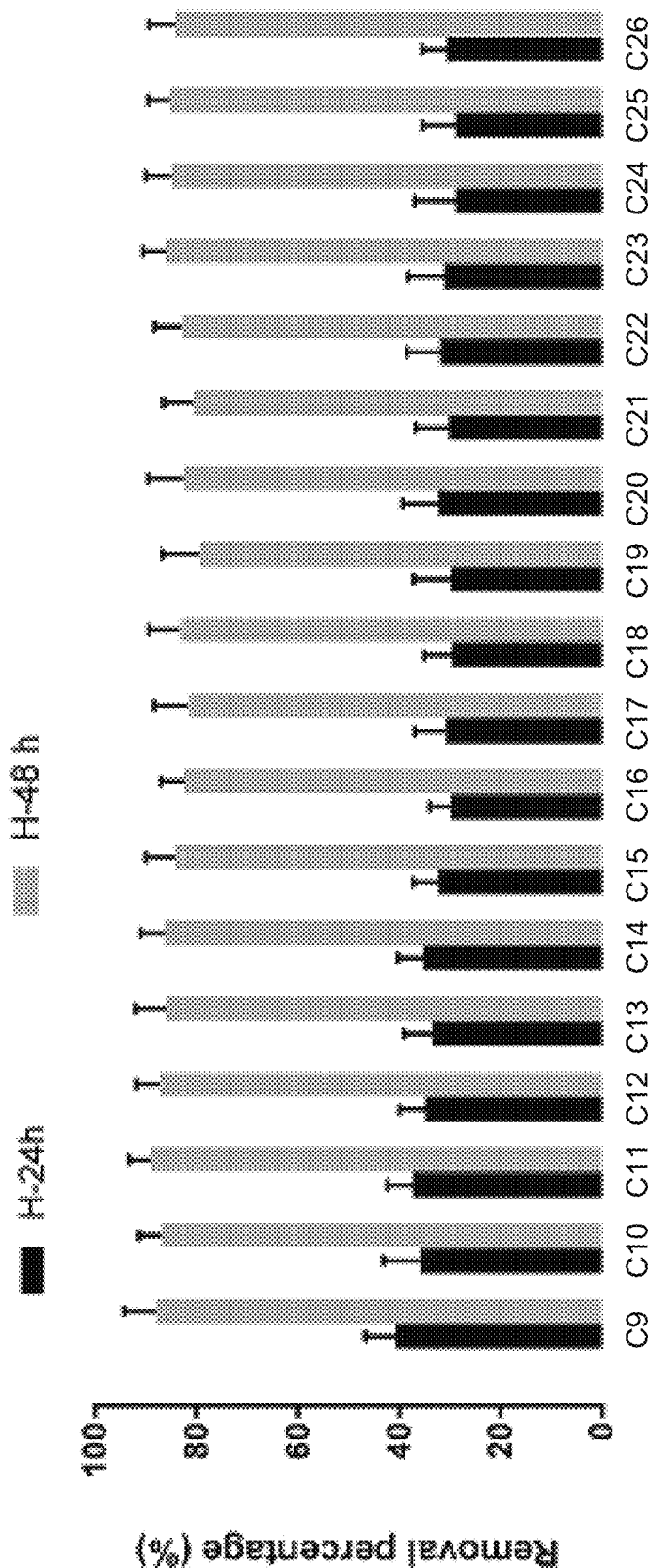
FIG. 7 presents GC-MS results of n-alkane removal/degradation by *Halamonas* sp. after 24 and 48 hours.

Experiments were then conducted to determine whether oil could be degraded separately by three different species of bacteria. For all species (*Halomonas* sp. results shown in FIG. 7), results from GC-MS showed that oil removal was negligible after just one-hour incubation, due to the low number of bacterial cells present. Subsequently, 30% of the added oil was degraded during the first 24 h, followed by nearly 100% removal after 48 h (FIG. 7 and Table 1) as bacterial numbers increased. No measurable degradation of oil was detected in the controls (without bacteria) after 48 hours incubation, which confirmed that oil degradation was primarily a bacterial process in the absence of nanomaterials. This result reveals that *Halomonas* sp. possesses a strong crude oil-degrading ability that requires approximately 48 hours. *V. gazogenes* and *M. hydrocarbonoclasticus* also demonstrated excellent oil degradation capacities, but only after 48 hours incubation (Figures S1 and S2). Data showed that 85% and 75% of alkane compounds were completely removed from samples by *V. gazogenes* and *M. hydrocarbonoclasticus* after 48 hours compared to controls.

TABLE 1

| | Oil removal (%) | | | | | |
|---|---|---|---|---|---|---|
| | 1 hour | | 24 hours | | 48 hours | |
| | X | SD | X | SD | X | SD |
| NPs | 65 | 5 | 65 | 6 | 65 | 8 |
| *Halamonas* sp. | 0 | 0 | 35 | 8 | 88 | 9 |
| *V. gazogenes* | 0 | 0 | 32 | 8 | 85 | 9 |
| *M. hydrocarbonoclasticus* | 0 | 0 | 29 | 10 | 75 | 11 |
| NPs + *Halomonas* sp. | 65 | 5 | 100 | 0 | 100 | 0 |
| NPs + *V. gazogenes* | 65 | 5 | 100 | 0 | 100 | 0 |
| NPs + *M. hydrocarbonoclasticus* | 65 | 5 | 95 | 5 | 100 | 0 |

X and SD represent mean and standard deviation.

Figure 8:
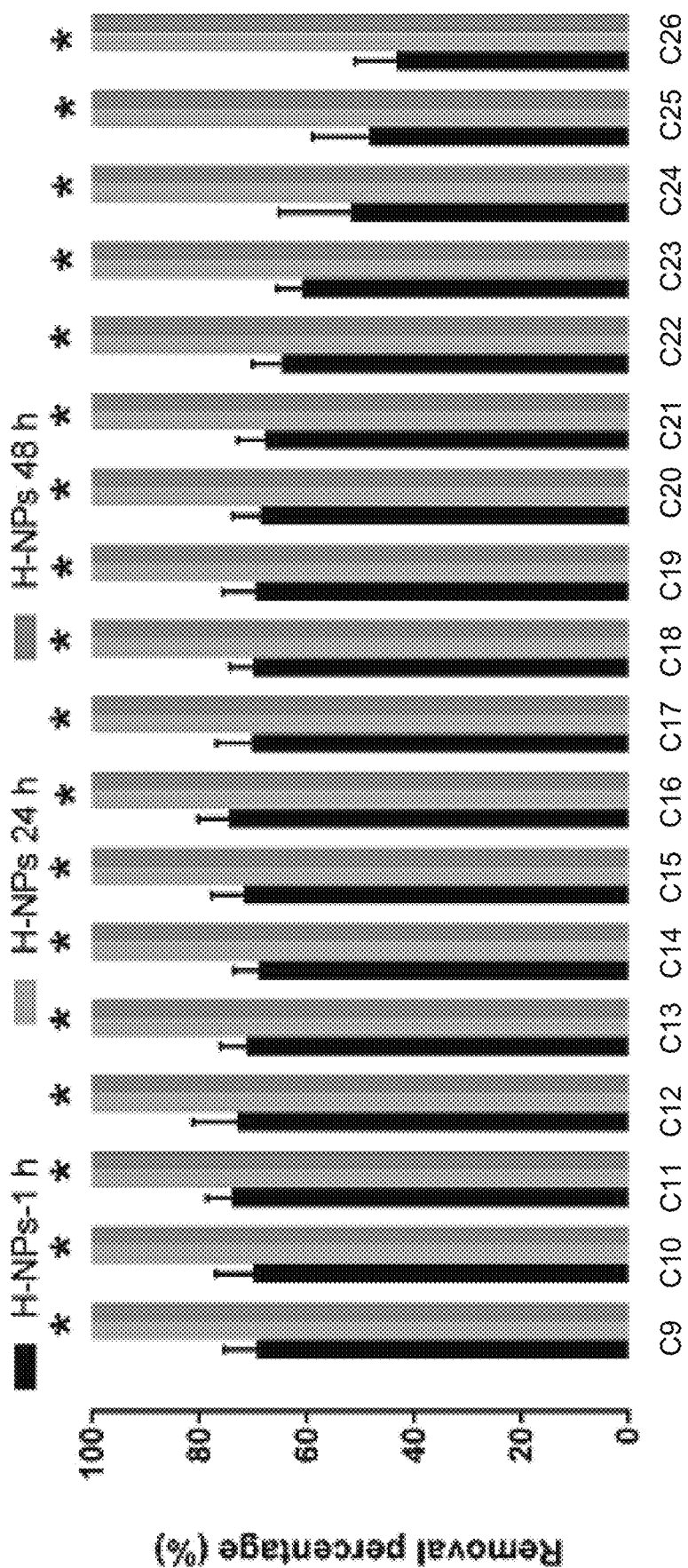
FIG. 8 presents GC-MS results of n-alkane removal/degradation by both PVP-coated iron oxide nanomaterials and *Halamonas* sp. after 24 and 48 hours. Error bars on FIG. 6-8 represent one standard deviation (n=3). *($p<0.05$).

The removal of n-alkanes (C9-C26) was enhanced significantly when nanomaterials and oil-degrading bacteria were added together. In the case of *Halomonas* sp. with the nanomaterials, the GC-MS results indicated an oil removal approaching 65-75% just after one hour (Table 1 and FIG. 8). This removal was likely due to the effectiveness of the nanomaterials in absorbing oil. However, removal percentages significantly increased (p>0.05) and reached 100% after only 24 h with both nanomaterials and bacteria present. Taken together, this suggests that the nanomaterials coupled with bacteria strongly improved oil removal, both in terms of kinetics and the total amount of oil removed.

In the case of *V. gazogenes* and *M. hydrocarbonoclasticus*, the results indicated that these strains, in the presence of PVP-coated iron oxide NPs also had excellent capability and capacity to remove oil from water (Table 1), equivalent to *Halomonas* sp.

The data suggest that the nanomaterials effectively remove oil toxicity. In addition, preliminary data (not shown) also showed that growth rates of bacteria were 20-30% higher in the presence of oil and nanomaterials, while rapid (<<48 hours) degradation of oil can be achieved in the laboratory.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method for detoxifying a multiphasic liquid, the method comprising:
    removing a sample of a multiphasic liquid comprising oil and water from a source of the multiphasic liquid;
    adding a plurality of nanomaterials to the sample of the multiphasic liquid, each of the plurality of nanomaterials comprising a magnetic core and a polymeric shell, the polymeric shell including a polyvinylpyrrolidone-based polymeric material;
    adding a cell suspension comprising an oil degrading bacteria to the sample together with the adding of the plurality of nanomaterials; and
    maintaining a mixture comprising the sample of the multiphasic liquid, the plurality of nanomaterials, and the oil degrading bacteria for a period of time, during which all of the oil of the multiphasic liquid sample is adsorbed by the nanomaterials and degraded by the oil degrading bacteria.

2. The method of claim 1, the oil-degrading bacteria comprising one or more of *Rhodococcus* spp., *Pseudomonas* spp., *Alcanivorax borkumensis*, *Agmenellum* spp., *Bacillus* spp., *Mycobacterium* spp., *Marinobacter* spp., *Halomonas* spp. and *V. gazogenes*.

3. The method of claim 2, the oil-degrading bacteria comprising one or more of *M. alkaliphilus*, *M. arcticus*, *M. hydrocarbonoclasticus*, *M. maritimus*, and *M. squaleniv-orans*.

4. The method of claim 1, wherein the magnetic core includes an iron oxide, a nickel oxide, or a cobalt oxide.

5. The method of claim 4, wherein the iron oxide comprises $Fe_3O_4$ and/or $g\text{-}Fe_2O_3$.

6. The method of claim 1, wherein the water of the multiphasic liquid comprises sea water or wastewater.

7. The method of claim 1, wherein the oil of the multiphasic liquid comprises a crude oil.

8. The method of claim 1, wherein the sample of the multiphasic liquid is obtained from an oil spill.

9. The method of claim 1, wherein the oil of the multiphasic liquid sample comprises C9-C26 chain alkanes, wherein about 70% of the C9-C22 chain alkanes and about 65% of the C23-C26 chain alkanes are adsorbed by the nanomaterials by the end of a first hour of maintaining the mixture.

10. The method of claim 1, wherein the sample further comprises one or more marine organisms, and wherein following the period of time, the one or more marine organisms exhibit less than 50% mortality.

11. The method of claim 10, wherein following the period of time, the one or more marine organisms exhibit less than 20% mortality.

12. The method of claim 1, wherein the plurality of nanomaterials are added to the sample such that the nanomaterials are at a concentration of from 2.5 ppm to 100 ppm in the sample.

13. The method of claim 1, wherein the period of time is 4 days or less.

14. The method of claim 13, wherein all of the oil of the multiphasic liquid sample is adsorbed by the nanomaterials and degraded by the oil degrading bacteria within 48 hours following addition of the nanomaterials and the cell suspension to the sample.

15. The method of claim 13, wherein all of the oil of the multiphasic liquid sample is adsorbed by the nanomaterials and degraded by the oil degrading bacteria within 24 hours following addition of the nanomaterials and the cell suspension to the sample.

16. The method of claim 1, further comprising, following the period of time, separating the plurality of nanomaterials from the sample.

17. The method of claim 16, further comprising recovering the oil adsorbed by the nanomaterials.

18. The method of claim 1, wherein 65-75% of the oil of the sample is adsorbed by the nanomaterials and degraded by the bacteria within 1 hour following addition of the plurality of the nanomaterials and the oil degrading bacteria to the sample of the multiphasic liquid.

19. The method of claim 1, wherein the polymeric shell completely covers the core of each of the nanomaterials and forms an external surface on each of the nanomaterials.

20. The method of claim 1, wherein the nanomaterials comprise spherical nanoparticles, plate-like nanoparticles, or nanoparticles having an aspect ratio greater than 1.

21. The method of claim 1, wherein the core has an average diameter of from about 15 nm to about 500 nm.

22. The method of claim 1, wherein the polymeric shell has a wall thickness of from about 1 nm to about 50 nm.

* * * * *